2,695,919
Patented Nov. 30, 1954

2,695,919

AMINOALCOHOLS

John B. Wright and Edward H. Lincoln, Kalamazoo, Mich., assignors to The Upjohn Company, Kalamazoo, Mich., a corporation of Michigan No Drawing. Application April 30, 1952,
Serial No. 285,306

7 Claims. (Cl. 260—570.6)

This invention relates to certain aminoalcohols and is more particularly concerned with γ-tertiaryamino-β-aryloxy-α-arylpropanols and acid addition salts and quaternary ammonium salts thereof, and to a novel process for the production thereof.

The novel compounds of the present invention are γ-tertiary-amino-β-aryloxy-α-arylpropanols represented by the following formula:

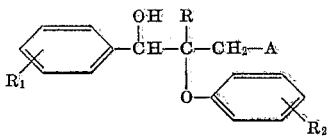

wherein R is selected from the group consisting of hydrogen and hydrocarbon radicals containing from one to eight carbon atoms, inclusive; $R_1$ and $R_2$ are selected from the group consisting of hydrogen, lower-alkyl, lower-alkoxy, halogen, and hydroxy radicals; and A is a tertiary amine radical whose valence belongs to the amine nitrogen and which is selected from the group consisting of di-lower-alkylamine, N-(lower-alkyl)benzylamine, dibenzylamine, pyrrolidine, piperidine, and morpholine radicals; and acid addition salts and quaternary ammonium salts thereof.

It is an object of the present invention to provide novel γ-tertiaryamino-β-aryloxy-α-arylpropanols and acid addition salts and quaternary ammonium salts thereof. Another object is the provision of a novel process for the production thereof. Other objects will be apparent to those skilled in the art to which this invention pertains.

The novel compounds of the present invention are prepared by reacting a secondary amine or hydrochloric acid addition salt thereof with formaldehyde or paraformaldehyde and an α-aryloxy-alkyl aryl ketone, and thereafter reacting the thus-produced β-tertiaryamino-α-aryloxyalkyl aryl ketone with a hydrogenating agent such as, for example, hydrogen and a hydrogenating catalyst, zinc and hydrochloric acid, lithium aluminum hydride, or the like, to produce a γ-tertiaryamino-β-aryloxy-α-arylpropanol. Aryl, wherever mentioned in this specification and the appended claims, is a univalent carbocyclic radical whose free valence belongs to the monocyclic nucleus. The novel compounds of the present invention possess valuable physiological properties including local anesthetic and bronchodilator activity.

The starting α-aryloxyalkyl aryl ketones can be prepared by reacting an α-bromoalkyl aryl ketone with an arylhydroxy compound in the presence of an alkali metal base, such as, for example, sodium hydroxide [Möhlau, Berichte, 15, 2498 (1882)]. The aryl groups of the starting compounds and the products may possess, at various positions on the carbocyclic nuclei, one or a plurality of substituents such as, for example, lower-alkyl and lower-alkoxy wherein the alkyl groups are methyl, ethyl, propyl, isopropyl, butyl, hexyl, heptyl, octyl, etc., benzyloxy, phenoxy, chlorine, bromine, iodine, or the like.

In carrying out the process of the present invention, an α-aryloxyalkyl aryl ketone is mixed with a secondary amine or acid addition salt thereof, and an aqueous solution of formaldehyde. Secondary amines within the purview of this invention are, for example, alkyl amines, arylalkyl amines, cycloalkyl amines, heterocyclic amines, and pyrrolidines, piperidines, and morpholines, including pyrrolidines, piperidines, and morpholines possessing one or a plurality of lower-alkyl groups at various positions of the cyclic nucleus. The reaction may also be carried out in a solvent such as, for example, methanol or ethanol. Alternatively, the aqueous solution of formaldehyde may be replaced with paraformaldehyde in which case an organic solvent is usually employed such as, for example, an excess of the starting ketone, ethanol, isoamyl alcohol, or the like. In following the process of the present invention, formaldehyde and the polymeric forms of formaldehyde are used interchangeably. The reaction is carried out at a temperature between about room temperature and the boiling point of the reaction mixture, usually between about 65 and about 100 degrees centigrade, with the reaction time being somewhat dependent upon the ketone employed and the temperature at which the reaction is carried out, between about one-half hour and about 24 hours being the normal reaction time. The thus-produced reaction product may then be isolated by the addition of a volume of water and extracting the whole with, for example, ether, ethyl acetate, benzene, or like water-immiscible solvent. The extract is then washed with successive portions of dilute base and water and thereafter dried and the solvent removed by distillation. Alternatively, the product can be distilled from the reaction mixture containing the free amine. The crude reaction mixture may be used directly to produce the novel compounds of the present invention by removing the solvent at reduced pressure and treating the residue with a hydrogenating agent such as, for example, zinc and hydrochloric acid, hydrogen and a catalyst, lithium aluminum hydride, or the like, and especially hydrogen in the presence of a palladium catalyst in a solvent such as, for example, methanol, ethanol, propanol, water, mixtures of these, or the like. Alternatively, the purified isolated amino ketone in a solution of ether or other suitable non-reactive solvent may be reacted with hydrogen in the presence of a palladium or platinum catalyst in an above-named solvent to produce the novel compounds of the present invention. The yield of aminoalcohol from the β-tertiaryamino-α-aryloxyalkyl aryl ketone is usually higher when the above-named ketone is isolated. However, satisfactory yields of product are obtained without isolation of the intermediate amino ketone.

The free aminoalcohols are usually high boiling liquids although some of the products with high molecular weights are solids. The acid addition salts, especially the hydrochlorides, and the quaternary ammonium salts are stable, crystalline, generally water-soluble and ether, methylene chloride, and benzene insoluble solids.

The following examples are illustrative of the processes and products of the present invention but are not to be construed as limiting.

PREPARATION 1.—α-PHENOXY-PARA-N-PROPOXYACETO-
PHENONE

To a stirred solution of 25.95 grams of para-n-propoxyacetophenone in one hundred milliliters of ether was added dropwise 23.3 grams of bromine while maintaining the reaction temperature at 10 to 15 degrees centigrade. After addition was complete, a large amount of solid precipitate separated. The ether was thereafter removed at reduced pressure, and a solution of 14.1 grams of phenol and 7.05 grams of sodium hydroxide in seventy milliliters of water was then added to the residue. The mixture was stirred and heated with refluxing for 14 hours whereafter the cooled reaction mixture was extracted twice with ether. The ether extracts were washed with water, the ether distilled at reduced pressure, and the residue was thereafter distilled through a short Vigreaux column to yield 19.1 grams of α-phenoxy-para-n-propoxyacetophenone boiling at 180 to 190 degrees centigrade at 0.6 milliliter of mercury pressure. The distillate solidified upon standing to yield colorless platelets which melted at 49 to 50.5 degrees centigrade after crystallization from a mixture of cyclohexene and petroleum ether.

Analysis: Percent calcd. for $C_{17}H_{18}O_3$: C, 75.53; H, 6.71. Found: C, 75.57; H, 6.42.

PREPARATION 2.—α-(PARA-N-PROPOXYPHENOXY)ACETO-
PHENONE

A stirred mixture of 19.9 grams (0.10 mole) of phenacyl bromide, 15.2 grams (0.10 mole) of para-n-propoxyphenol, 18.5 grams of anhydrous potassium carbonate and 200 milliliters of acetone was heated at reflux temperature for seven hours. The cooled reaction mixture was thereafter diluted with 200 milliliters of water and the whole extracted several times with ether. The ether extracts were washed with two 100-milliliter portions of a ten percent aqueous sodium hydroxide solution and were then dried with anhydrous sodium sulfate and the solvent thereafter removed by distillation. The oily residue was crystallized from a two to one solution of ethyl alcohol and water to yield α-(para-n-propoxyphenoxy)acetophenone which melted at 56.5 to 58 degrees centigrade after crystallization from ethyl alcohol.

In a similar manner, other α-aryloxyacetophenones, α-aryloxypropiophenones, and α-aryloxyalkyl aryl ketones are prepared by reacting the selected α-bromoalkyl aryl ketone with a phenol in the presence of an alkali metal base such as, for example, potassium carbonate, sodium hydroxide, or the like.

PREPARATION 3.—β-DIETHYLAMINO-α-PHENOXYPROPIO-
PHENONE HYDROCHLORIDE

A mixture of 2.19 grams (0.02 mole) of diethylamine hydrochloride, one drop of concentrated hydrochloric acid, 0.9 gram (0.03 mole) of paraformaldehyde, 4.24 grams (0.02 mole) of α-phenoxyacetophenone [Möhlau, Berichte, 15, 2498 (1882)], and six milliliters of absolute ethanol was heated with reflux on a steam bath whereupon the mixture soon became homogeneous. Heating was continued for one hour, 0.6 gram (0.02 mole) of paraformaldehyde was added, heating was resumed for two hours, an additional 0.6 gram (0.02 mole) of paraformaldehyde added, and the whole then heated for two more hours. The mixture was then maintained at room temperature for sixteen hours and thereafter diluted with thirty milliliters of water and the whole then washed with ether. The aqueous layer was separated, made basic with ammonium hydroxide and thereafter extracted with ether. The ether extract was dried with anhydrous magnesium sulfate and then distilled at reduced pressure. The residual oil of β-diethylamino-α-phenoxypropiophenone was redissolved in dry ether and there was then added thereto about a stoichiometric amount of an ethereal solution of hydrogen chloride. The precipitated β-diethylamino-α-phenoxypropiophenone hydrochloride weighed 4.50 grams and melted at 128 to 129 degrees centigrade. One crystallization of these crystals from an equal mixture of methyl ethyl ketone and ethyl acetate gave colorless cubical prisms melting at 128.5 to 129 degrees centigrade (corrected).

Analysis: Percent calculated for $C_{19}H_{24}ClNO_2$: C, 68.35; H, 7.25; N, 4.20; Cl, 10.62. Found: C, 68.31; H, 6.97; N, 4.58; Cl, 10.52.

PREPARATION 4.—β-DIMETHYLAMINO-α-PHENOXYPROPIO-
PHENONE HYDROCHLORIDE

Following the procedure of Preparation 3, β-dimethylamino-α-phenoxypropiophenone melting at 56.5 to 57.5 degrees centigrade was prepared in 78 percent yield from dimethylamine, paraformaldehyde, hydrochloric acid, and α-phenoxyacetophenone. The thus-produced β-dimethylamino-α-phenoxypropiophenone was converted, with an ethereal solution of hydrogen chloride, to β-dimethylamino-α-phenoxypropiophenone hydrochloride which melted at 153 to 154 degrees centigrade (corrected) after crystallization from methyl ethyl ketone.

Analysis: Percent calculated for $C_{17}H_{20}ClNO_2$: C, 66.77; H, 6.59; N, 4.58; Cl, 11.09. Found: C, 66.40; H, 6.52; N, 4.49; Cl, 11.06.

PREPARATION 5.—β-DIMETHYLAMINO-α-(PARA-N-PRO-
POXYPHENOXY)-PROPIOPHENONE HYDROCHLORIDE

Ten milliliters of a 37 percent formaldehyde solution was added dropwise to a stirred solution of a slight molar excess of dimethylamine in 150 milliliters of 95 percent ethanol maintained at zero degrees centigrade. The resulting colorless solution was warmed to room temperature and 27 grams (0.10 mole) of α(para-n-propoxyphenoxy)-acetophenone was then added thereto. The whole was refluxed for four hours whereafter 250 milliliters of water was added and the whole extracted with ether. The ether layer was separated and washed with a dilute hydrochloric acid solution. The aqueous acid extract was made basic with a dilute sodium hydroxide solution and thereafter extracted with ether. Upon evaporation of the ether, oily β-dimethylamino-α-(para-n-propoxyphenoxy)-propiophenone was obtained in 58 percent yield which was converted, with an ethanolic solution of hydrogen chloride, to β-dimethylamino-α-(para-n-propoxyphenoxy)-propiophenone hydrochloride. Addition of ether to the mixture precipitated the oily hydrochloride which melted at 152.5 to 154 degrees centigrade on a Fisher-Johns melting block after crystallization from a one to two mixture of absolute ethanol and ether.

Analysis: Percent calculated for $C_{20}H_{26}ClNO_3$: C, 66.01; H, 7.20; Cl, 9.74. Found: C, 66.36; H, 7.19; Cl, 9.90.

PREPARATION 6.—β-DIMETHYLAMINO-α-METHYL-α-
PHENOXYPROPIOPHENONE HYDROCHLORIDE

Following the procedure of Preparation 5 and refluxing for seventeen hours, β-dimethylamino-α-methyl-α-phenoxypropiophenone was prepared from dimethylamine, formaldehyde and α-phenoxypropiophenone. The thus-produced β - dimethylamino - α - methyl - α - phenoxypropiophenone was converted with an ethanolic solution of hydrogen chloride to β-dimethylamino-α-methyl-α-phenoxypropiophenone hydrochloride which melted at 188 to 189.5 degrees centigrade on a Fisher-Johns melting block after crystallization from a mixture of equal parts of absolute ethanol and ether.

Analysis: Percent calculated for $C_{18}H_{22}ClNO_2$: C, 67.59; H, 6.94; Cl, 11.09. Found: C, 67.75; H, 6.87; Cl, 11.06.

PREPARATION 7.—β-DIMETHYLAMINO-α-METHYL-α-PHE-
NOXY-3,4-DIBENZYLOXYPROPIOPHENONE HYDROCHLORIDE

Following the procedure of Preparation 3, using dimethylamine, formaldehyde and 3,4-dibenzyloxypropiophenone, β-dimethylamino-α-methyl-α-phenoxy-3,4-dibenzyloxypropiophenone was prepared which was converted, using an ethanolic solution of hydrogen chloride, to β-dimethylamino - α - methyl - α - phenoxy - 3,4 - dibenzyloxypropiophenone hydrochloride which melted at 172 to 173 degrees centigrade after crystallization from a one to two mixture of ethanol and ether.

In a manner essentially that described in Preparations 1 through 7, other β-tertiaryamino-α-aryloxyalkyl aryl ketones are prepared by reacting a secondary amine, especially di-lower-alkyl amines, and formaldehyde or the polymeric forms of formaldehyde with an α-aryloxyalkyl aryl ketone possessing at least one α-hydrogen. Compounds thus produced include: β-diethylamino-α-(para-chlorophenoxy)-ortho-methoxypropiophenone from diethylamine, formaldehyde and α-(para-chlorophenoxy)-ortho - methoxyacetophenone; β - dihexylamino - α - (meta-benzyloxyphenoxy)-α-phenylpropiophenone from dihexylamine, formaldehyde and α-(meta-benzyloxyphenoxy)-α-phenylacetophenone; β-morpholino-α-(ortho-bromophenoxy)-para-methylpropiophenone from morpholine, formaldehyde and α-(ortho-bromophenoxy)-para-methylacetophenone, and the like.

*Example 1.—γ-Diethylamino-β-phenoxy-α-phenyl-
propanol and its hydrochloride*

A solution of 16.92 grams (0.0507 mole) of β-diethylamino-α-phenoxypropiophenone hydrochloride in 125 milliliters of 95 percent ethanol was subjected for eight hours to the hydrogenating action of approximately three atmospheres of hydrogen in the presence of 0.5 gram of a ten percent palladium on charcoal catalyst. The catalyst was then removed by filtration and the filtrate was distilled to dryness. The last traces of solvent were removed at reduced pressure. The colorless syrupy residue crystallized on standing to yield the theoretical seventeen grams of γ-diethylamino-β-phenoxy-α-phenylpropanol hydrochloride melting at 147.5 to 148.5 degrees centigrade. One crystallization of these crystals from methyl ethyl ketone yielded product in the form of rectangular prisms melting at 149.5 to 150 degrees centigrade.

Analysis: Percent calculated for $C_{19}H_{26}ClNO_2$: C, 67.94; H, 7.80; Cl, 10.56; N, 4.17. Found: C, 67.89; H, 7.59; Cl, 10.66; N, 4.26.

The thus-produced γ-diethylamino-β-phenoxy-α-phenylpropanol hydrochloride was converted to γ-diethylamino- β-phenoxy-α-phenylpropanol by the action of sodium methoxide in a solution of absolute ethanol.

The methyl bromide quaternary ammonium salt of γ-diethylamino-β-phenoxy-α-phenylpropanol is prepared by dissolving the free base in anhydrous ether, cooling the resulting solution contained in a round-bottom flask to zero degrees centigrade and then adding thereto a large molar excess of methyl bromide cooled to about zero degrees centigrade. The tightly stoppered flask is maintained at about room temperature for about twelve hours whereafter the precipitated γ-diethylamino-β-phenoxy-α-phenylpropanol methobromide can be isolated by filtration and purified by crystallization from a solvent such as, for example, a mixture of ethyl alcohol and ether.

*Example 2.—γ-Dimethylamino-β-phenoxy-α-phenylpropanol hydrochloride*

Following the procedure set forth in Example 1, β-dimethylamino-α-phenoxypropiophenone hydrochloride was converted, in a two to one solution of ethanol and water, to γ-dimethylamino-β-phenoxy-α-phenylpropanol hydrochloride which melted at 160 to 160.5 degrees centigrade after one crystallization from a fifteen to one mixture of methyl ethyl ketone and ethanol.

Analysis: Percent calculated for $C_{17}H_{22}ClNO_2$: C, 66.33; H, 7.21; Cl, 11.52; N, 4.55. Found: C, 66.85; H, 7.13; Cl, 11.59; N, 4.65.

γ-Dimethylamino-β-phenoxy-α-phenylpropanol is obtained by treatment of the above-obtained hydrochloride with sodium hydroxide.

*Example 3.—γ-Dimethylamino-β-methyl-β-phenoxy-α-phenylpropanol hydrochloride*

In the same manner as set forth in Example 1, γ-dimethylamino-β-phenoxy-β-methyl-α-phenylpropanol hydrochloride was prepared from β-dimethylamino-α-methyl-α-phenoxypropiophenone hydrochloride and melted, after crystallization from a one to four mixture of ethanol and ether, at 185 to 188 degrees centigrade.

Analysis: Percent calculated for $C_{18}H_{24}ClNO_2$: C, 67.17; H, 7.52; Cl, 11.02. Found: C, 67.26; H, 7.55; Cl, 11.22.

*Example 4.—γ-Dimethylamino-β-(para-n-propoxyphenoxy)-α-phenylpropanol hydrochloride*

In the same manner as set forth in Example 1, γ-dimethylamino - β - (para-n-propoxyphenoxy)-α-phenylpropanol hydrochloride was prepared from β-dimethylamino-α-(para-n-propoxyphenoxy)propiophenone hydrochloride and melted, after crystallization from a one to 3.5 mixture of ethanol and ether, at 159 to 160 degrees centigrade.

Analysis: Percent calcuated for $C_{20}H_{28}ClNO_3$: C, 65.65; H, 7.71; Cl, 9.69. Found: C, 65.84; H, 7.51; Cl, 97.2.

*Example 5.—γ-Dimethylamino-β-methyl-β-phenoxy-α-(3,4-dihydroxyphenyl)-propanol hydrochloride*

In the same manner as set forth in Example 1, γ-dimethylamino - β - methyl - β-phenoxy-α-(3,4-dihydroxyphenyl)-propanol hydrochloride was prepared from β-dimethylamino - α - methyl-α-phenoxy-3,4-dibenzyloxypropiophenone and melted, after crystallization from a one to four to 3.5 mixture of ethanol, methyl ethyl ketone, and ether, at 171.5 to 173 degrees centrigrade.

Analysis: Percent calculated for $C_{18}H_{24}ClNO_4$: C, 61.10; H, 6.84; Cl, 10.02. Found: C, 60.95; H, 6.54; Cl, 10.00.

In the manner described in Examples 1 through 5, other γ-tertiaryamino-β-aryloxy-α-arylpropanols are prepared by reacting the selected β-tertiaryamino-α-aryloxyalkyl aryl ketone with a hydrogenating agent. Hydrogenating agents included within the purview of the present invention include lithium aluminum hydride, zinc and hydrochloric acid, hydrogen in the presence of catalysts such as, for example, platinum, palladium, Raney nickel, or the like, and others.

The novel compounds of the present invention may conveniently be prepared by hydrogenating the selected β-tertiaryamino-α-aryloxyalkyl aryl ketone with lithium aluminum hydride in ether or hydrogen in the presence of platinum or palladium catalyst in methanol or ethanol or by hydrogenating the hydrochloric acid addition salt of the selected β-tertiaryamino-α-aryloxyalkyl aryl ketone with hydrogen in the presence of a palladium catalyst to produce the hydrochloric acid addition salt of a compound of the present invention. Compounds thus-prepared include: γ-N-(methyl)isopropylamino-β-ethyl-(ortho-cresoxy)-α-phenylpropanol from β-N-(methyl)isopropylamino-α-ethyl-α-(ortho-cresoxy)propiophenone; γ-di-n-propylamino-β-n-propyl-β-phenoxy-α-phenylpropanol from β-di-n-propylamino-α-n-propyl-α-phenoxypropiophenone; γ-N - (methyl)isooctylamino - β - isobutyl - β - (para - n - hexylphenoxy)-α-phenylpropanol from β-N-(methyl)isooctylamino - α - isobutyl - α - (para - n - hexylphenoxy)-propiophenone; γ-di-n-octylamino-β-n-hexyl-β-(ortho-methoxyphenoxy) - α - (ortho - methoxyphenyl)propanol from β-di-n-octylamino-α-n-hexyl-α-(ortho-methoxyphenoxy)-ortho-methoxypropiophenone; γ-pyrrolidyl-β-isooctyl-β-(ortho-n-propoxyphenoxy)-α-(meta-ethoxyphenyl)-propanol from β-pyrrolidyl-α-isooctyl-α-(ortho-n-propoxyphenoxy)-meta-ethoxypropiophenone; γ-2-methylpyrrolidyl - β - cyclohexyl - β - (ortho - chlorophenoxy) - α - (para-chlorophenyl)propanol from β-2-methylpyrrolidyl-α - cyclohexyl - α - (ortho - chlorophenoxy) - para - chloropropiophenone; γ-piperidyl-β-cyclopentyl-β-(meta-chlorophenoxy)-α-(ortho-bromophenyl)propanol from β-piperidyl - α - cyclopentyl - α - (meta - chlorophenoxy) - ortho-bromopropiophenone; γ-2-methylpiperidyl-β-(meta-iodophenoxy)-α-(meta-bromophenyl)propanol from β-2-methylpiperidyl - α - (meta - iodophenoxy) - meta - bromopropiophenone; γ-morpholino-β-(meta-bromophenoxy)-α-(para-iodophenyl)propanol from β-morpholino-α-(meta-bromophenoxy)-para-iodopropiophenone; γ-N-(methyl) cyclohexylamino-β-(para-benzyloxyphenoxy)-α-(ortho-methoxyphenyl)propanol from β-N-(methyl)cyclohexylamino - α - (para-benzyloxyphenoxy)-ortho-methoxypropiophenone; γ-N-(methyl)benzylamino-β-(para-phenoxyphenoxy)-α-(meta-benzyloxyphenyl)propanol from β-N - (methyl)benzylamino - α - (para - phenoxyphenoxy) - meta-benzyloxypropiophenone; and γ-dibenzylamino-β-(para - hydroxyphenoxy) - α - (para - phenoxyphenyl)-propanol from β-dibenzylamino-α-(para-hydroxyphenoxy)-para-phenoxypropiophenone, and the like.

The acid addition salts of these and other γ-tertiary-amino-β-aryloxy-α-arylpropanols are prepared by reacting the selected γ-tertiaryamino-β-aryloxy-α-arylpropanol with about a stoichiometric amount of an acid such as, for example, hydrochloric acid, acetic, sulfuric, citric, nitric, tartaric, phosphoric, lactic, succinic, or the like, in a solvent such as, for example, methanol, ethanol, benzene, toluene, chloroform, methylene chloride, pentane, mixture of these, and others. The hydrochloric acid addition salt is conveniently obtained by the reduction of the hydrochloride of the corresponding β-tertiaryamino-α-aryloxyalkyl aryl ketone with hydrogen in the presence of a palladium catalyst.

The quaternary ammonium salts of these and other γ-tertiaryamino-β-aryloxy-α-arylpropanols are prepared by reacting the selected aminopropanol with an alkyl halide such as, for example, methyl chloride, ethyl chloride, propyl chloride, hexyl chloride, benzyl chloride, methyl bromide, ethyl bromide, isopropyl bromide, octyl bromide, methyl iodide, ethyl iodide, or the like. The reaction can be run in the absence of a solvent or in the presence of a solvent such as, for example, ether, benzene, ethyl acetate, ethanol, or the like, at a temperature between about zero degrees centigrade and the boiling point of the reaction mixture. Optimum yields are usually obtained when the reaction is run at a temperature between about room temperature and the boiling point of the reaction mixture for between about a few hours and about 48 hours.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound selected from the group consisting of (1) amine bases represented by the formula:

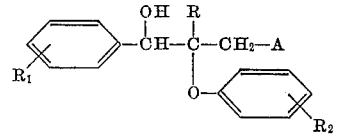

wherein R is selected from the group consisting of hydrogen and hydrocarbon radicals containing from one to eight carbon atoms, inclusive; $R_1$ and $R_2$ are selected from the group consisting of hydrogen, lower-alkyl, lower-alkoxy, halogen and hydroxy radicals; and A is a tertiary amine radical whose valence belongs to the amine nitrogen and is selected from the group consisting of di-lower-alkylamine, N-(lower-alkyl)benzylamine, dibenzylamine, pyrrolidine, piperidine, and morpholine radicals; and (2) acid addition salts thereof, and quaternary ammonium salts thereof.

2. An acid addition salt of a γ-di-lower-alkylamino-β-phenoxy-α-phenylpropanol.

3. An acid addition salt of a γ-di-lower-alkylamino-β-lower-alkyl-β-phenoxy-α-phenylpropanol.

4. An acid addition salt of a γ-di-lower-alkylamino-β-(lower-alkoxyphenoxy)-α-phenylpropanol.

5. γ-Dimethylamino-β-phenoxy-α-phenylpropanol hydrochloride.

6. γ-Diethylamino-β-phenoxy-α-phenylpropanol hydrochloride.

7. γ - Dimethylamino - β - methyl - β - phenoxy - α - (3,4 - dihydroxyphenyl) - propanol hydrochloride.

References Cited in the file of this patent

Denton et al., J. A. C. S., vol. 71 (1949), pp. 2048–2052.